(12) United States Patent
Nordmann et al.

(10) Patent No.: US 11,734,164 B2
(45) Date of Patent: Aug. 22, 2023

(54) METHOD AND COMPUTER PROGRAM FOR TESTING A TECHNICAL SYSTEM

(71) Applicant: Robert Bosch GmbH, Stuttgart (DE)

(72) Inventors: Arne Nordmann, Stuttgart (DE); Peter Munk, Renningen (DE); Andreas-Juergen Rohatschek, Wernau/Neckar (DE); Eike Martin Thaden, Renningen (DE); Lydia Gauerhof, Sindelfingen (DE); Markus Schweizer, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 163 days.

(21) Appl. No.: 17/354,888

(22) Filed: Jun. 22, 2021

(65) Prior Publication Data
US 2021/0406161 A1 Dec. 30, 2021

(30) Foreign Application Priority Data
Jun. 29, 2020 (EP) .................... 20182923

(51) Int. Cl.
*G06F 11/36* (2006.01)
(52) U.S. Cl.
CPC ...... *G06F 11/3688* (2013.01); *G06F 11/3684* (2013.01)
(58) Field of Classification Search
CPC ... G06F 11/36; G06F 11/3684; G06F 11/3688
See application file for complete search history.

(56) References Cited

U.S. PATENT DOCUMENTS

| | | | | |
|---|---|---|---|---|
| 2005/0251298 | A1* | 11/2005 | Gvillo | G06F 8/30 701/3 |
| 2007/0288208 | A1* | 12/2007 | Grigsby | G06Q 10/06 703/2 |
| 2009/0282384 | A1* | 11/2009 | Keppler | G06F 8/10 717/106 |
| 2018/0096042 | A1* | 4/2018 | Kuzma | H04L 9/3236 |
| 2019/0236559 | A1* | 8/2019 | Padmanabhan | G06Q 20/02 |
| 2019/0266332 | A1* | 8/2019 | Quiros Araya | G06F 11/3612 |
| 2019/0303541 | A1* | 10/2019 | Reddy | G06F 21/64 |
| 2019/0303579 | A1* | 10/2019 | Reddy | H04L 9/50 |

(Continued)

OTHER PUBLICATIONS

SafetyADD: A Tool for Safety-Contract Based Design, 2014 IEEE International Symposium on Software Reliability Engineering Workshops (Year: 2014).*

(Continued)

*Primary Examiner* — Kamini B Patel
(74) *Attorney, Agent, or Firm* — Norton Rose Fulbright US LLP; Gerard Messina

(57) ABSTRACT

A method for testing a, in particular safety-relevant, technical system, in particular encompassing software. The system is represented by a model encompassing at least two or more components. An assumption of a respective component regarding the safety-relevant system, and a guarantee of a respective component to the safety-relevant technical system, are specified by a safety contract. Executable program code is generated based on at least one assumption and based on at least one guarantee. The safety-relevant technical system is tested by executing the program code.

8 Claims, 2 Drawing Sheets

(56) References Cited

U.S. PATENT DOCUMENTS

| | | | | |
|---|---|---|---|---|
| 2019/0303623 | A1* | 10/2019 | Reddy | G06F 8/71 |
| 2019/0305957 | A1* | 10/2019 | Reddy | H04L 63/123 |
| 2019/0305959 | A1* | 10/2019 | Reddy | H04L 9/006 |
| 2019/0306173 | A1* | 10/2019 | Reddy | G06F 11/3604 |
| 2022/0358030 | A1* | 11/2022 | Yanamala | G06F 21/604 |

OTHER PUBLICATIONS

Warg et al., "Safety Add: A Tool for Safety-Contract Based Design," SP Technical Research Institute of Sweden, 2014, pp. 1-14. <http://www.warg.org/fredrik/publ/wosocer2014/WoSoCer2014_SafetyADD_presentation.pdf> Downloaded Jun. 22, 2021.

Oertel et al., "Proving Compliance of Implementation Models To Safety Specifications," Safecomp 2014 Workshops, LNCS 8696, 2014, pp. 97-107.

Schoeneman et al., "Integrating Behavior Driven Development and Programming By Contract," ICCSA 2013, Part V, LNCS 7975, 2013, pp. 590-606.

Hoang et al., "Spark 2014 and Gnatprove a Competition Report From Builders of an Industrial-Strength Verifying Compiler," International Journal Software Tools Technology Transfer, 2015, vol. 17, pp. 695-707.

Nandi et al., "Stochastic Contracts for Runtime Checking of Component-Based Real-Time Systems," Central Board of Secondary Education (CBSE), 2015, pp. 111-116.

Meyer, "Applying "Design By Contract"," Computer, vol. 25, Issue 10, 1992, pp. 40-51.

Li et al., "A Contract-Based Component Model for Embedded Systems," Proceedings of the Fourth International Conference On Quality Software (QSIC'04), 2004, pp. 1-8.

* cited by examiner

METHOD AND COMPUTER PROGRAM FOR TESTING A TECHNICAL SYSTEM

CROSS REFERENCE

The present application claims the benefit under 35 U.S.C. § 119 of European Patent Application No. EP 20182923.1 filed on Jun. 29, 2020, which is expressly incorporated herein by reference in its entirety.

BACKGROUND INFORMATION

The present invention relates to a method and an apparatus for testing a, in particular safety-relevant, system.

The present invention further relates to a computer program that can be used in the apparatus and/or the method for testing the system.

The system is a technical system, in particular encompassing software components and/or hardware components.

Such systems are usually created and/or designed, inter alia, in the context of model-based systems engineering. The system is typically modeled, for example using UML or SysML, in the form of components having ports and connections between those ports. The system can also be modeled as a hierarchical model, such that one component can encompass one or several further components.

Model-based safety analysis (MBSA) uses this model by adding to the system a further, safety-oriented view of the system. One possibility is to add so-called "safety contracts" to the components. Safety contracts are derived from contract-based design and are conventional in the art, for example in Warg, F., Vedder, B., Skoglund, M. & Söderberg, A., "Safety ADD: A Tool for Safety-Contract Based Design," in 2014 IEEE International Symposium on Software Reliability Engineering Workshops, 2014, pp. 527-529.

Safety contracts serve for compositional specification of safety requirements of safety-related systems that conform to the component structure of hierarchical system models and are linked to them. For each component, a safety contract specifies safety-related "assumptions" that are to be satisfied by their direct environment (e.g., their higher-order component), and corresponding safety-related "guarantees" that the component in turn offers.

The purpose of safety contracts is to support developers and safety managers in evaluating the safety of system models, in particular the ability of the selected component structures to satisfy all safety requirements.

SUMMARY

An example embodiment of the present invention relates to a method for testing an, in particular safety-relevant, technical system, in particular encompassing software components and/or hardware components, the system being represented by a model encompassing at least two or more components; and an assumption of a respective component regarding the safety-relevant system and a guarantee of a respective component to the safety-relevant system being specified by a safety contract, wherein in one step executable program code is generated based on at least one assumption and based on at least one guarantee, and in a further step the safety-relevant system is tested by executing the program code.

Conventionally, program code for testing functions of a system is generated during or after development of the system, and it is derived from implemented functions of the system. The specification can, however, deviate from the actual implementation of functions in a final product. In this case it is not possible to guarantee, by deriving the program code from the implementation, that the final product actually complies with the specification.

In contrast thereto, the method in accordance with an example embodiment of the present invention generates program code for testing the system based on assumptions and guarantees specified in the safety contract. Execution of the program code therefore tests whether the assumptions and guarantees specified in the safety contract have been applied in the context of implementation of the system.

The components typically encompass ports, in particular inputs for receiving data and outputs for transmitting data. Further connections between the ports of various components are modeled in the model.

The assumption of a respective component is to be satisfied by the environment of the component, for example a higher-order component. Assumptions therefore usually refer to data to be received at the input of the component.

The guarantee of a respective component is to be satisfied in turn by the component. Guarantees therefore usually refer to data to be transmitted at the output of the component.

In accordance with an example embodiment of the present invention, provision is made that generation of the program code encompasses: generating program code for testing at least one function of at least one component, so as to check whether the guarantee of the component from the safety contract is being complied with.

In accordance with an example embodiment of the present invention, provision is made that testing further encompasses: executing the program code in order to test the function of at least one component.

In accordance with an example embodiment of the present invention, provision is made that generation of the program code encompasses: generating program code in order to monitor at least one component, in particular an input of the component, so as to check whether the assumption of the component from the safety contract is being complied with.

In accordance with an example embodiment of the present invention, provision is made that testing further encompasses: executing the program code in order to monitor at least one component, in particular at the runtime of the safety-relevant system, in particular during operation of the safety-relevant system.

In accordance with an example embodiment of the present invention, provision is made that generation of the program code is accomplished automatically. When the safety contracts are formalized, generation of program code, and thus also testing of the system, can be carried out automatically.

The assumptions and guarantees are formulated in the safety contract, for example, in natural language, but can be automatically converted into logical expressions, for example using text recognition methods. The logical expressions are then correspondingly converted into program code. Concatenated structures of statements can be converted, in particular successively, into corresponding expressions in program code.

In accordance with an example embodiment of the present invention, provision is made that generation of the program code further encompasses: generating program code in order to test at least one function of the, in particular safety-relevant, system and/or in order to monitor the, in particular safety-relevant, system, on a system level.

In accordance with an example embodiment of the present invention, provision is made that testing further encompasses: executing the program code in order to test at least one function of the, in particular safety-relevant, system and/or in order to monitor the, in particular safety-relevant, system, on a system level.

In accordance with an example embodiment of the present invention, provision is made that the method further encompasses: generating executable program code based on at least one of the following system requirements: safety, comfort, homologation aspects. The system requirements are formulated, for example, in natural language in specification documents, but can be automatically converted into logical expressions, for example using text recognition methods. The logical expressions are then correspondingly converted into program code. Concatenated structures of statements can be converted, in particular successively, into corresponding expressions in program code.

In accordance with a further example embodiment of the present invention, provision is made that the system can be designed by application of the method. For example, it is possible to analyze whether or not a specific component can be replaced by another component, in particular having similar functionality, so that the assumptions and guarantees from the safety contract continue to be satisfied.

Further example embodiments of the present invention relate to application of the method to testing of a control device encompassing software components and hardware components, for example for a driving, braking, steering, or assistance system of an, in particular at least partly automated, vehicle. The control device can be tested by application of the method to safety-critical requirements.

Further example embodiments of the present invention relate to an apparatus, the apparatus being embodied to execute a method in accordance with the embodiments.

Further example embodiments of the present invention relate to a computer program encompassing executable program code, the program code being based on a safety contract between a safety-relevant system and at least one component of the safety-relevant system, the safety contract encompassing at least one assumption of the component regarding the safety-relevant system and/or at least one guarantee of the component to the safety-relevant system.

Further features, potential applications, and advantages of the present invention are evident from the description below of exemplifying embodiments of the present invention which are depicted in the Figures. All features described or depicted in that context, individually or in any combination, constitute the subject matter of the present invention, regardless of their respective presentation or depiction in the description or in the figures.

DETAILED DESCRIPTION OF EXAMPLE EMBODIMENTS

Figure 1:
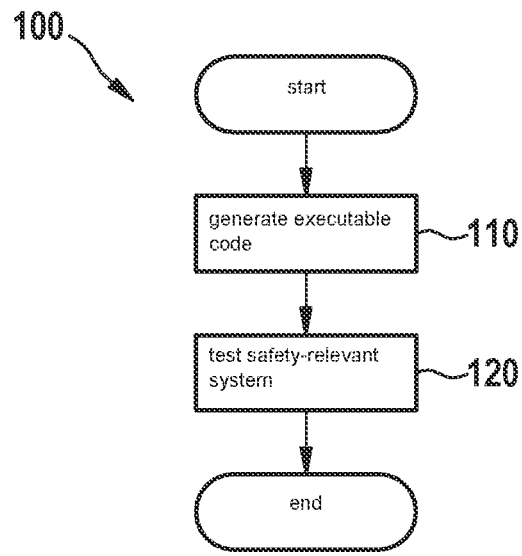
FIG. 1 schematically depicts, in a flow chart, steps of a method for testing a technical system, in accordance with an example embodiment of the present invention.

A method 100 for testing a technical system will be described below with reference to FIG. 1.

The technical system is a safety-relevant system, in particular encompassing software components and/or hardware components.

Figure 2:
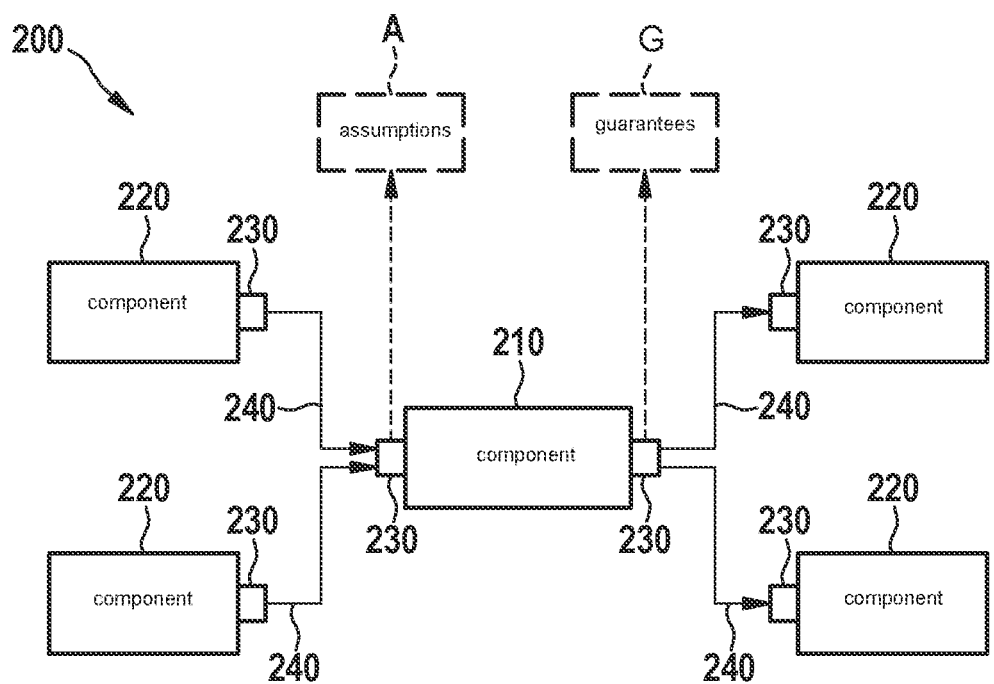
FIG. 2 schematically depicts a technical system as a model, in accordance with an example embodiment of the present invention.

In accordance with the embodiment depicted, the system is represented by a model 200 (see FIG. 2).

In accordance with the embodiment depicted, model 200 encompasses, by way of example, component 210 and further components 220.

Components 210, 220 encompass ports 230, in particular inputs for receiving data and outputs for transmitting data. Connections 240 between ports 230 of components 210, 220 are modeled.

Model 200 further encompasses safety contracts in which assumptions A of components 210, 220 regarding the system, in particular of further components 210, 220 of the system, and guarantees G of components 210, 220 to the system, in particular to further components 210, 220 of the system, are specified. FIG. 2 schematically depicts assumptions A of component 210 with respect to components 220, and guarantees G of component 210 with respect to components 220.

The system is, for example, a technical system of a vehicle. Component 210 is, for example, a control device or a calculation unit of a control device, in particular for propulsion of the motor vehicle. Components 220 are, for example, sensors, in particular for optical sensing, and/or actuators, in particular for application of control to a propulsion unit of the vehicle and/or to a steering unit of the vehicle. Components 220, in particular the sensors, transfer data to component 210, in particular the control device. Component 210 in turn transfers data to components 220. In this case, assumption A of component 210 is the assumption that component 220 transfers data at predefinable times to component 210. In this case, guarantee G of component 210 is, for example, the guarantee that component 210 transfers data to components 220 at predefinable times.

Method 100 for testing will be further described below, again with reference to FIG. 1.

In accordance with the embodiment depicted, in a step 110 of method 100 executable program code is generated based on the assumptions and based on the guarantees of the safety contract.

In accordance with the embodiment depicted, in a step 120 of method 100, the safety-relevant system is tested by executing the program code.

In accordance with an embodiment, provision is made that generation 110 of the program code encompasses: generating program code for testing at least one function of at least one component, so as to check whether the guarantee of the component from the safety contract is being complied with.

In accordance with an embodiment, provision is made that testing 120 further encompasses: executing the program code in order to test the function of at least one component.

In accordance with an embodiment, provision is made that generation 110 of the program code encompasses: generating program code in order to monitor at least one component, in particular an input of the component, so as to check whether the assumption of the component from the safety contract is being complied with.

In accordance with an embodiment, provision is made that testing 120 further encompasses: executing the program code in order to monitor at least one component, in particular at the runtime of the safety-relevant system, in particular during operation of the safety-relevant system.

In accordance with an embodiment, provision is made that generation 110 of the program code is accomplished automatically. The assumptions and guarantees are formulated in the safety contract, for example, in natural language, but can be automatically converted into logical expressions, for example using text recognition methods. The logical expressions are then correspondingly converted into program code. Concatenated structures of statements can be converted, in particular successively, into corresponding expressions in program code.

In accordance with an embodiment, provision is made that generation 110 of the program further encompasses: generating program code in order to test at least one function of the, in particular safety-relevant, system and/or in order to monitor the, in particular safety-relevant, system, on a system level.

In accordance with an embodiment, provision is made that testing 120 further encompasses: executing the program code in order to test at least one function of the, in particular safety-relevant, system and/or in order to monitor the, in particular safety-relevant, system, on a system level.

In accordance with an embodiment, provision is made that method 100 further encompasses: generating executable program code based on at least one of the following system requirements: safety, comfort, homologation aspects.

Figure 3:
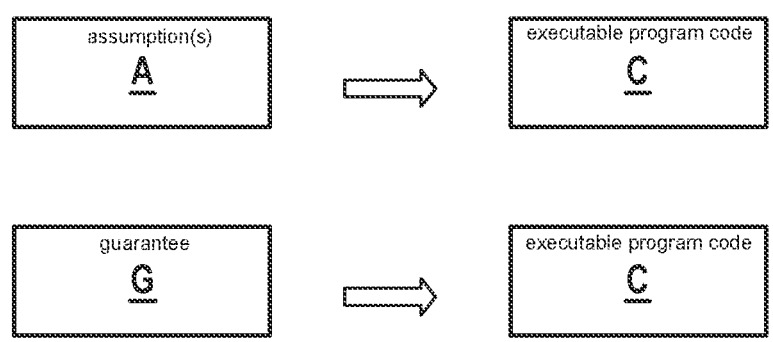
FIG. 3 schematically depicts, in a block diagram, steps of a method in accordance with a further embodiment of the present invention.

FIG. 3 schematically depicts assumption A and guarantee G of component 210. Executable program code C is generated by method 100 based on assumption A and guarantee G.

What is claimed is:

1. A method for testing a safety-relevant technical system encompassing software components and/or hardware components, the safety-relevant technical system being represented by a model encompassing (a) representations of at least some of the components and (b) at least one safety contract, each of the at least one safety contract specifying (a) an assumption of a respective component of the at least some of the components regarding at least one further component of the at least some of the components, and (b) a guarantee of the respective component to at least one further component of the at least some of the components, the method comprising the following steps:
generating executable program code by:
converting, automatically by a processor, natural language of the assumption and the guarantee into logical expressions using text recognition;
converting, automatically by the processor, the logical expressions into the executable program code; and
testing the safety-relevant technical system by executing the program code.

2. The method as recited in claim 1, wherein the executable program code, when executed, tests at least one function of the respective component of the safety contract so as to check whether the guarantee of the respective component of the safety contract is being complied with.

3. The method as recited in claim 1, wherein executable program code, when executed, monitors an input of the respective component of the safety contract so as to check whether the assumption of the respective component of the safety contract is being complied with.

4. The method as recited in claim 3, wherein the testing includes executing the executable program code in order to monitor respective component of the safety contract at a runtime of the safety-relevant system during operation of the safety-relevant technical system.

5. The method as recited in claim 1, wherein the executable program code, when executed, tests at least one function of the safety-relevant technical system and/or monitors the safety-relevant technical system on a system level.

6. The method as recited in claim 1, wherein the generating of the executable program code is based on at least one of the following system requirements: safety, comfort, and homologation aspects.

7. An apparatus for testing a safety-relevant technical system encompassing software components and/or hardware components, the safety-relevant technical system being represented by a model encompassing (a) representations of at least some of the components and (b) at least one safety contract, each of the at least one safety contract specifying (a) an assumption of a respective component of the at least some of the components regarding at least one further component of the at least some of the components, and (b) a guarantee of the respective component to at least one further component of the at least some of the components, the apparatus comprising:
a programmed processor, wherein the programmed processor is configured to:
generate executable program code by:
automatically converting natural language of the assumption and the guarantee into logical expressions using text recognition;
automatically converting the logical expressions into the executable program code; and
test the safety-relevant technical system by executing the program code.

8. A non-transitory computer-readable medium on which are stored instructions that are executable by a processor and that, when executed by the processor, cause the processor to perform a method for testing a safety-relevant technical system encompassing software components and/or hardware components, the safety-relevant technical system being represented by a model encompassing (a) representations of at least some of the components and (b) at least one safety contract, each of the at least one safety contract specifying (a) an assumption of a respective component of the at least some of the components regarding at least one further component of the at least some of the components, and (b) a guarantee of the respective component to at least one further component of the at least some of the components, the method comprising the following steps:
generating executable program code by:
automatically converting natural language of the assumption and the guarantee into logical expressions using text recognition;
automatically converting the logical expressions into the executable program code; and
testing the safety-relevant technical system by executing the program code.

* * * * *